United States Patent [19]

Goto et al.

[11] 4,109,160
[45] Aug. 22, 1978

[54] CONTROL SYSTEM FOR HYDROELECTRIC POWER STATION SYSTEM

[75] Inventors: Masuo Goto; Akira Isono; Tunehiko Takakusagi; Masanobu Araki; Haruo Ishikawa; Yukio Yamaguchi, all of Hitachi, Japan

[73] Assignee: Hitachi, Ltd., Japan

[21] Appl. No.: 713,579

[22] Filed: Aug. 11, 1976

[30] Foreign Application Priority Data

Aug. 13, 1975 [JP] Japan .................................. 50-97556

[51] Int. Cl.² ................................................ F15B 1/06
[52] U.S. Cl. ......................................... 290/52; 415/1; 415/17
[58] Field of Search .................. 290/52; 415/1, 17, 24

[56] References Cited

U.S. PATENT DOCUMENTS

| 2,646,812 | 7/1953 | Rheingans et al. | 415/17 |
| 2,724,082 | 11/1955 | Hornfeck | 290/52 |
| 3,600,595 | 8/1971 | Yasunobu | 290/52 |

*Primary Examiner*—Robert K. Schaefer
*Assistant Examiner*—John W. Redman
*Attorney, Agent, or Firm*—Craig & Antonelli

[57] ABSTRACT

In a control system for a hydroelectric power station system including upper and lower water reservoirs connected through a water channel, an intermediate water reservoir having a smaller storage capacity than those of the upper and lower reservoirs and provided on the water channel in cascade with the upper and lower reservoirs, and two power stations disposed between the upper and intermediate reservoirs and between the intermediate and lower reservoirs, respectively, the control system is arranged such that the water level of the intermediate reservoir is detected continuously and the detected value of the water level is used to correct the load instructions which are applied to the power stations for controlling outputs of the power stations whereby the water level of the intermediate reservoir is maintained substantially constant, while the power generation of the power stations is controlled so as to satisfactorily meet with the load instruction applied to the power system.

15 Claims, 14 Drawing Figures

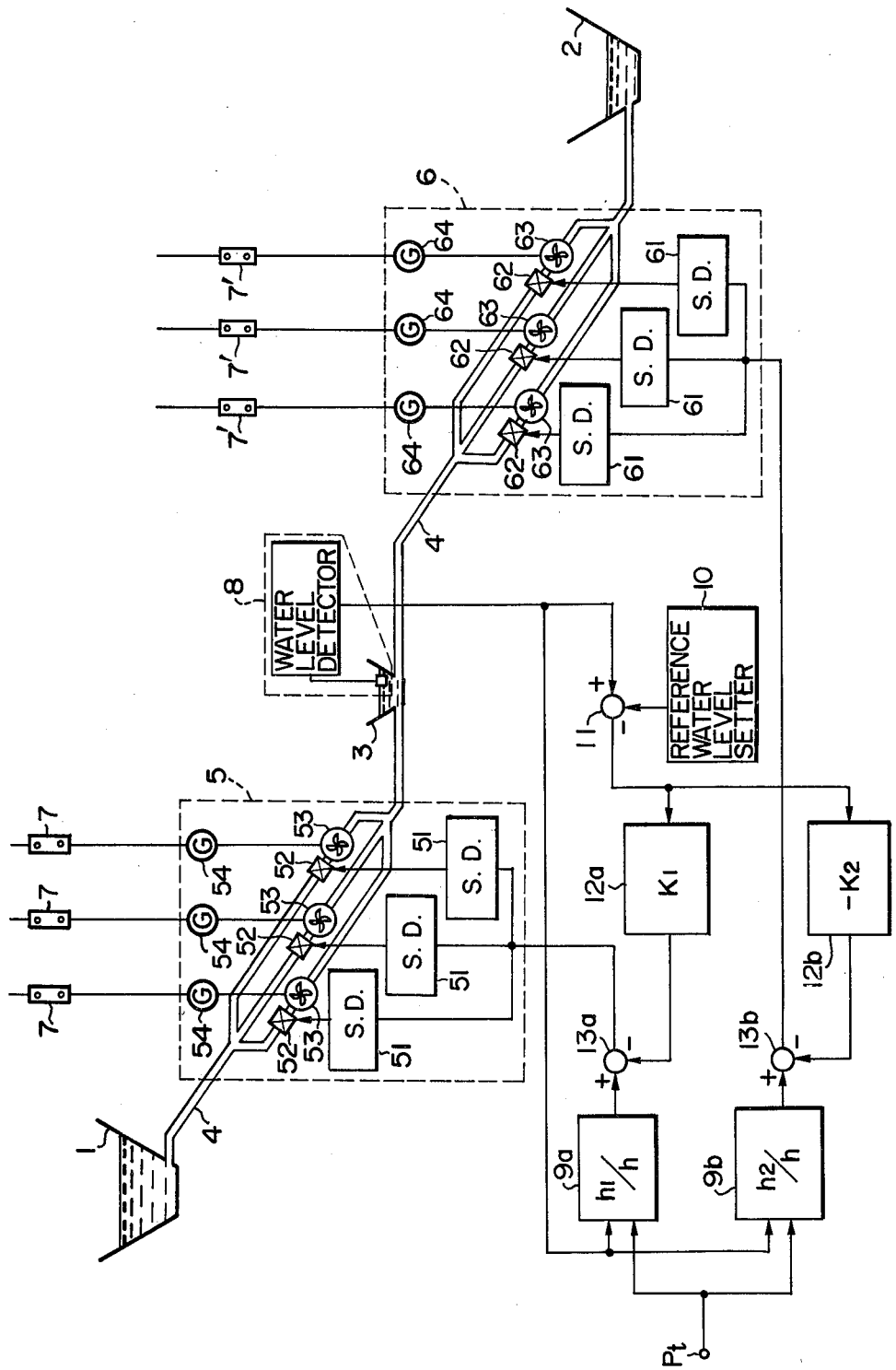
F I G. 1

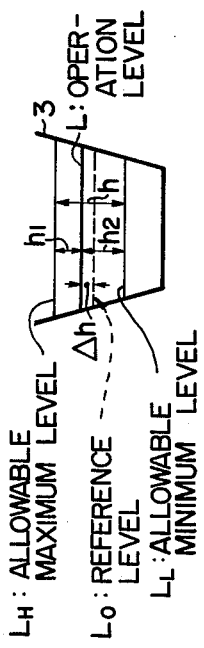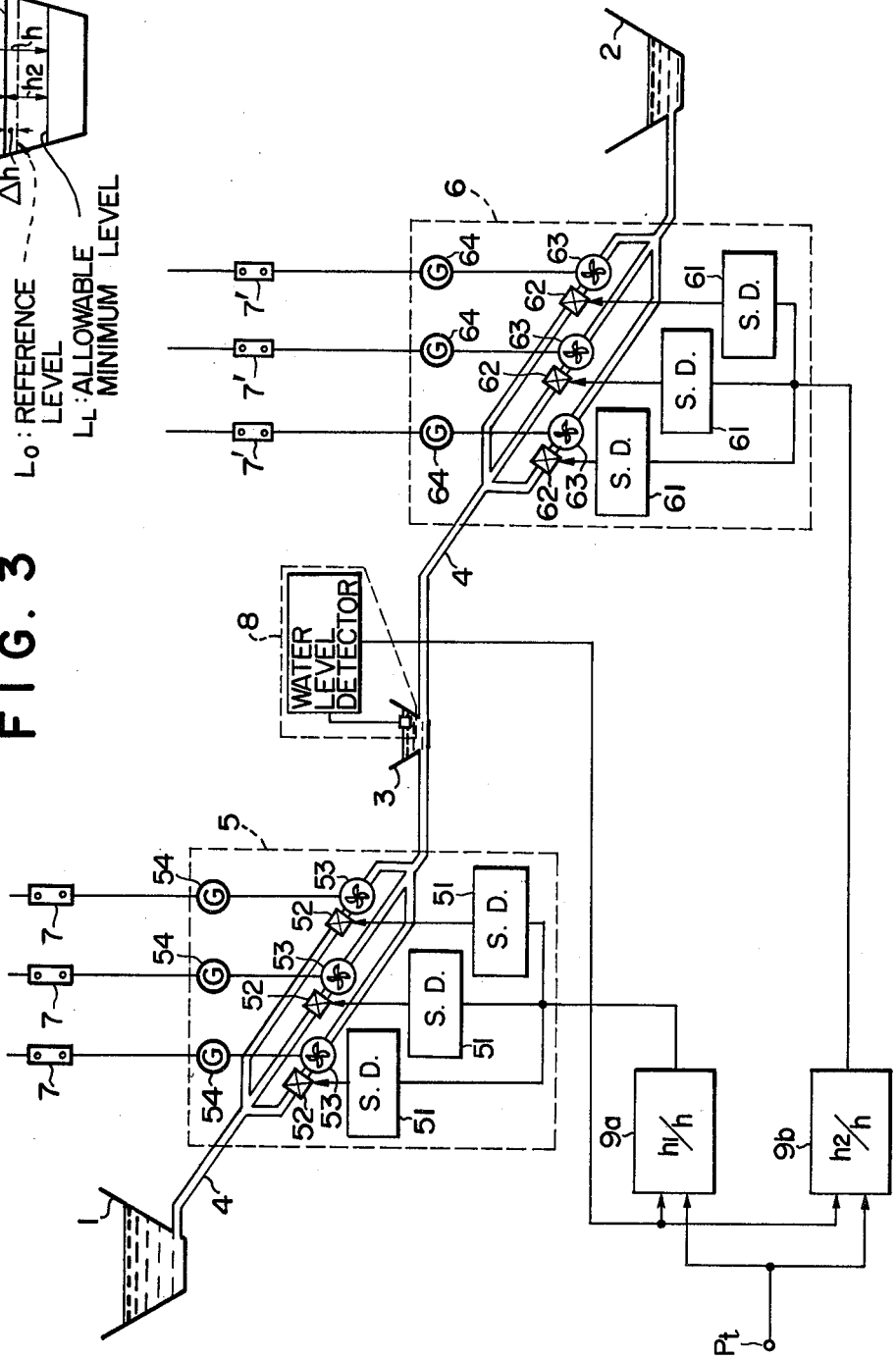

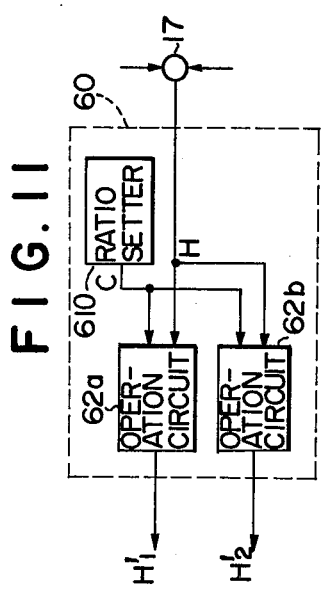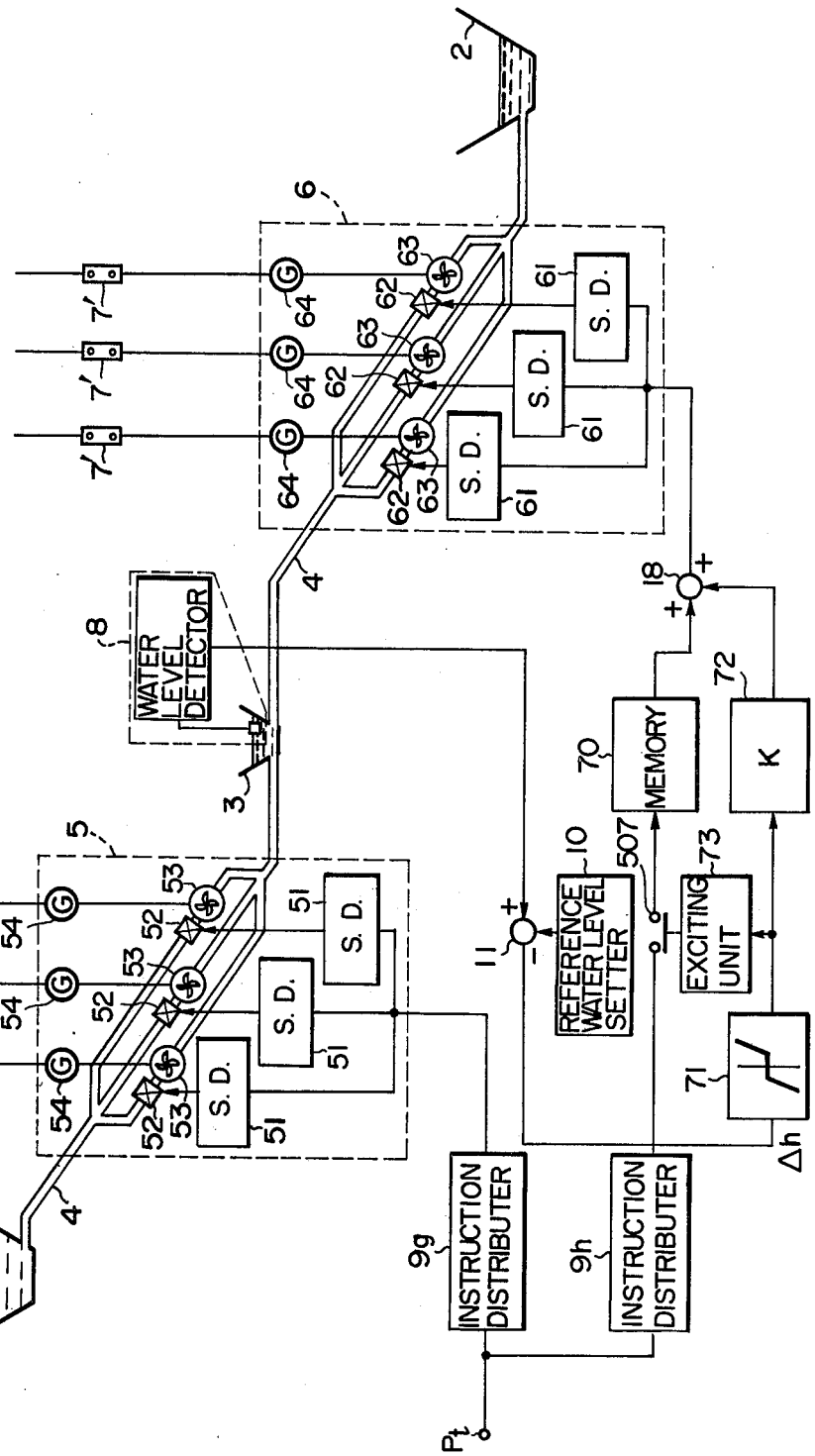

CONTROL SYSTEM FOR HYDROELECTRIC POWER STATION SYSTEM

BACKGROUND OF THE INVENTION

1. FIELD OF THE INVENTION

The present invention relates to a control system for hydroelectric power stations. More particularly, invention relates to a control system for hydroelectric power station systems of the type in which reservoir means is disposed between other two reservoir means provided upper and lower sites, respectively, these three reservoir means are connected in cascade by means of water channel, the intermediate reservoir means having smaller water storage capacity than those of upper and lower ones, and hydroelectric power stations are installed on the water channel connecting the intermediate reservoir means and that connecting the intermediate and lower reservoir means, respectively.

2. DESCRIPTION OF THE PRIOR ART

The demand for electric power greatly varies with hours in a day and with seasons in a year. For example, the demand for power may have a peak for a shorter period in day-time and be reduced greatly in mid-night. Therefore, it is desired that the operation of power stations is controlled to meet with such variation of the demand. Thermal or nuclear power stations are not suitable to be operated for power supply according to the power demand variations, since these stations are difficult in adjusting the generator and their efficiencies are low unless they are operated substantially at full load. It is for that reason that the thermal or nuclear power stations are used for supplying the steady base part of the demand for power and the hydroelectric power stations, which are relatively easy in adjustment of their outputs, are used for supplying the variable part of the demand. At present day most of advantageous and satisfactory sites for hydroelectric power stations have been already developed. For this, it is very difficult to find new sites where it would be possible to construct new hydroelectric power stations having desired capacities. Therefore, attention is now being paid to the so-called pumped storage power station, in which the water once used for driving the generator is stored in a lower reservoir and pumped up to and stored in an upper reservoir, the stored water being reused whenever it is needed.

The pumped storage power station uses water wheels and pumps or pump-water wheels disposed in the water channel connecting the upper reservoir with the lower reservoir. At the time of great demand for power, the water wheel is driven for power supply while, at the off-peak time in midnight, the pump is driven by using surplus powers in the power system for pumping up the water stored in the lower reservoir to the upper reservoir. The construction of such a pumped storage power station, however, is restricted on the ground of geological of topographical problems. One of the geological problems is that the lay of the site does not allow to construct the upper and lower reservoirs having a head or lift therebetween which is not too large, as compared with the capacity of the pumps and waterwheels of hydroelectric power station. A typical topographical problem is the difficulties of the works for installing water pressure tubes for guiding the water to the power station or of the engineering works for the power station construction.

For reducing these restrictions, there has been proposed a hydroelectric power station system in which an additional reservoir is provided between the upper and lower reservoirs, and power stations are installed between the upper and intermediate reservoirs and between the intermediate and lower reservoirs, respectively.

So long as the construction cost is concerned, it is undesirable to additionally construct the intermediate reservoir in the pumped storage power station system. For this, it is required to have the water storage capacity of the intermediate reservoir as small as possible. However, if the water storage capacity of the intermediate reservoir is very small in order to reduce its construction cost, the water level of the intermediate reservoir will greatly change, depending on the operation conditions of the respective power stations, that the stored water increases too much resulting in overflows or decreases to an extremely low level. This is unavoidable since it results from the difference of the "water-flow quantity-head" characteristics or the efficiency between the pum-wheels installed in the respective power stations. This problem may be readily solved, in the case of mere pumping up of the water. By monitoring and controlling the water level of the reservoir during the pumping operation so as to prevent such overflow or shortage of the stored water. In the case of operating the system for power generation, however, if the respective power stations were operated so as merely to keep constant the water level of the intermediate reservoir, the loads imposed on the respective power stations should necessarily change and thus it would be impossible to provide a stable power supply matching to the demand for power. Conversely, if the control were made to operate the respective power stations mainly for power generation matching to the power demand, the water level of the intermediate reservoir should greatly change.

SUMMARY OF THE INVENTION

Accordingly, an object of the present invention is to provide a control system for pumped storage hydroelectric power station which is capable of stable operation of the power stations with an intermediate reservoir having a smaller water storage capacity than required in the prior art for the stable operation.

Another object of the present invention is to provide a control system for pumped storage hydroelectric power stations which is capable of greatly decreasing the variation of the water level in the intermediate reservoir, while the power generation of the power stations meets satisfactorily the demand for power.

These objects are achieved in the present invention in a manner such that the respective power stations are basically operated under load instructions determined in accordance with the load requirement for the power station system, while the load instructions are corrected depending on the actual water level of the intermediate reservoir.

BRIEF DESCRIPTION OF THE DRAWINGS

FIG. 1 shows a block diagram of the control system in an embodiment of the present invention in which the shares of load for the respective power stations are corrected depending on the water level of the intermediate reservoir.

FIG. 2 is a schematic diagram illustrating the reference level, operating level, allowable highest level and allowable lowest level of the water in the intermediate reservoir.

FIG. 3 shows a block diagram of the control system in another embodiment of the present invention in which the shares of load for the respective power stations are controlled exclusively according to variation of the water level of the intermediate reservoir.

FIG. 11 is a block diagram of an operation circuit used in the embodiment of FIG. 10.

FIG. 12 is a block diagram of the control circuit in a further embodiment of the present invention in which when the deviation of the water level in the intermediate reservoir exceeds a predetermined range at least one of the power stations is controlled on the basis of the deviation of the water level.

DESCRIPTION OF THE PREFERRED EMBODIMENT

Figure 4:
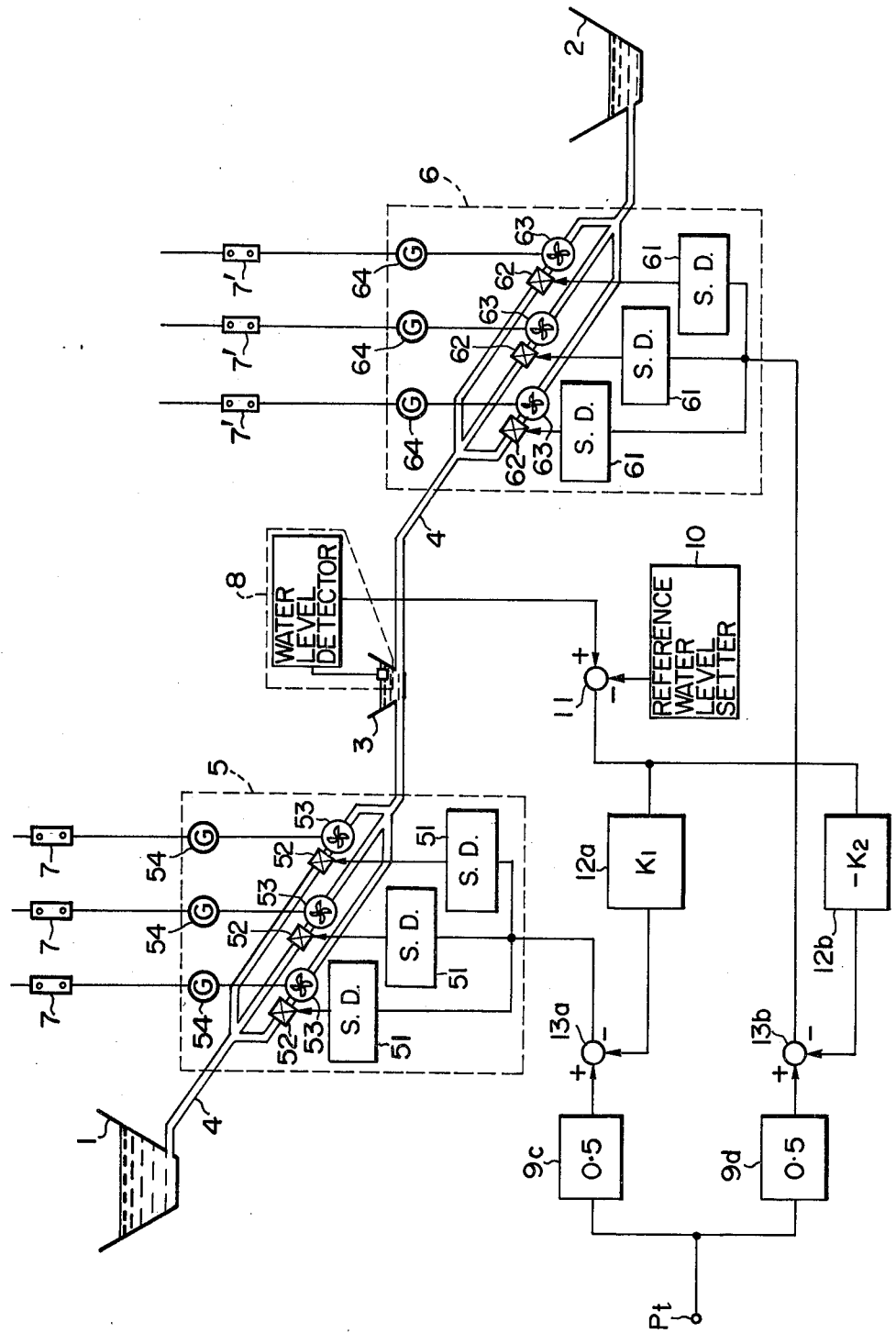
FIG. 4 shows a block diagram of the control system in another embodiment of the present invention in which the shares of load for the respective power stations are preset and corrected depending on variation of the water level of the intermediate reservoir.

On the water channel connecting an upper water reservoir with a lower water reservoir, an intermediate water reservoir having a smaller water storage capacity than those of the upper and lower reservoirs is disposed in cascade with them. Hydroelectric power stations are installed between the upper and intermediate reservoirs, and between the intermediate and lower reservoirs, respectively. In such a hydroelectric power station system, this invention is aimed at maintaining the water level substantially constant, while the power generation of the power stations is satisfactorily matched to the load requirements.

FIG. 1 shows an embodiment of the present invention in which the load instructions which are applied to the respective power stations and determined by predetermined load distribution thereto are corrected depending on the water level of the intermediate reservoir thereby to change the actual load distribution and also depending on the deviation of the water level from a reference level so that desired load distribution is quickly reached. In FIG. 1, the intermediate reservoir 3 is provided on a water channel 4 connecting the upper reservoir 1 to the lower reservoir 2. An upper power station generally designated by reference numeral 5 is installed on a part of the water channel 4 connecting the upper reservoir 1 with the intermediate reservoir 3, while a lower power station 6 on another part of the water channel 4 connecting the intermediate reservoir 3 with the lower reservoir 2. In FIG. 1 both the power stations 5 and 6 are shown typically as each being provided with three pump-water wheels arranged in parallel, each group of pump-waterwheels being designated by numerals 53 and 63. In the upper station 5, each dynamo-generator 54 is driven by the rotational force of the corresponding pump-waterwheel 53, generating electric power which in turn is transmitted outside through a circuit breaker 7. The rotational force of the pump wheel 53 is controlled by adjusting the opening of a guide vane 52. It is noted here that the guide vane 52 is controlled in a well known manner by using a suitable control system so as to have the amount of its opening according to a given opening signal. Reference numeral 51 designates a signal distributor for converting the load instruction directed to the power station 5 into the opening signal which is turn is applied to the corresponding guide vane. The output of the signal distributor 51 adjusts the opening of the guide vane 52. In the lower power station 6, signal distributors 61, guide vanes 62, a pump-waterwheels 63 and dynamo-generators 64 are also arranged to have similar functions. The individual load instructions for both power stations are obtained by distributing, as mentioned hereinafter, an overall load instruction corresponding to the total load requirement for this power station system. The intermediate reservoir 3 is provided with a water level detector 8 for detecting the water level of the intermediate reservoir. This water level detector 8 may easily be realized, for example, by providing a floating structure (not shown) movable with the water level variation of the intermediate reservoir 3, and the water level variation is detected as the resistance variation of the potentiometer (not shown) slidable responsive to the movement of the floating structure. Load distribution units designated by reference numerals 9a and 9b are used to distribute the overall load instruction $P_t$ to both the power stations 5 and 6 in the following manner. The distribution is performed on the basis of the water level of the intermediate reservoir. As shown in FIG. 2, three different water levels are predetermined for the intermediate reservoir 3, that is, a reference water level $L_o$, an allowable maximum water level $L_H$ above the reference water level $L_o$ and an allowable minimum water level $L_L$ below the same. The difference between the maximum and the minimum water level $L_H$ and $L_L$ is designated by reference character $h$, as shown in the figure. The actual water level L of the intermediate reservoir when the power station is operating will be called as operation water level. Reference characters $h_1$ and $h_2$ will be used to designate the differences between the operation water level L and the maximum water level $L_H$, and between the operation water level L and the minimum water level $L_L$, respectively. These water level differences $h_1$ and $h_2$ can easily be obtained, if the operation water level L of the intermediate reservoir 3 is detected by the water level detector 8. On the basis of the water level differences detected $h_1$ and $h_2$, each of the load distribution units 9a and 9b provides an optimum distribution of the overall load instruction $P_t$ to be directed to each of the power stations. In more particular, the load distribution unit 9a receives $h_1$ and produces a signal indicative of $h_1/h$ times load instruction $P_t$, while the unit 9b produces a signal indicative of $h_2/h$ times of the load instruction $P_t$, where $h = h_1 + h_2$. It is noted that the outputs of the respective load distribution units 9a and 9b may vary in accordance with the operation water level L of the intermediate reservoir 3, but the sum of them does not vary. An adder 11 adds the operation water level L detected by the water level detector 8 to the reference water level $L_o$ of the reference water level preset in a reference water level setter 10, with the polarities as shown in FIG. 1, thereby producing the deviation of the operation water level from the reference water level. The difference produced is then applied to respective gain compensators 12a and 12b. These gain compensators 12a and 12b are used in order that the operation of the power station is quickly responsive to the water level variation of the intermediate reservoir 3. The gains of these compensators are determined on the basis of control characteristics of the respective power stations 5 and 6. These gains could be equal, if various control characteristics of the pump-waterwheels provided in both the power stations are identical. Adders 13a and 13b add the outputs of the gain compensators 12a and 12b to the outputs of the load distribution units 9a and 9b, respectively, with the polarities as shown in the figure and apply the signals added to the respective power stations 5 and 6. That is, the add signals are the load instructions to the respective power stations 5 and 6. It should be noted here that the output signals of the gain compensators 12a and 12b are smaller that those of the load distribution units 9a and 9b, yet the output signals of the gain compensators 12a and 12b are effective to correct the load instructions depending on the deviation of the water level of the intermediate reservoir so that larger inputs for correction are applied to the lower stations thereby to compensate for the delay in operation of the power stations in response to change of the load instructions, whereby the correction of the water level of the intermediate reservoir is quickly achieved.

Description will be given of the operation of the control system of FIG. 1 when the water level of the intermediate reservoir 3 varies. Assume now that, with the operation of the power stations 5 and 6 in accordance with the individual load instructions, the operation water level L of the intermediate reservoir 3 increases $\Delta h$ above the reference water level $L_o$. The water level detector 8 detects the operation water level of the intermediate reservoir 3 and produces a detected signal to the respective load distribution units 9a and 9b. The load distribution units 9a and 9b receives the detected signal, to produce the ratios of $h_1/h$ and $h_2/h$. Assume that the overall load instruction $P_t$ given to the whole power station system including the power stations 5 and 6 is "1." The load instruction of $P_t \times (h_1/h) = h_1/h$ is directed to the power station 5 by the load distribution unit 9a, while the load instruction of $P_t \times h_2/h = h_2/h$ to the power station 5 by the load distribution unit 9b. As seen from FIG. 2, when the water level of the intermediate reservoir 3 increases, the water level difference $h_1$ decreases but the difference $h_2$ increases. More particularly, when the water level of the intermediate reservoir rises, the load instruction $P_t \times (h_1/h)$ directed to the power station 5 becomes smaller and the guide vane acts to reduce the amount of water flow into the pump-waterwheel 53. Conversely, the load instruction $P_t \times (h_2/h)$ directed to the power station 6 becomes larger, and the guide vane acts to increase the amount of water flow into the pump-waterwheel 63. At this time, the adder 11 supplies the respective gain compensators 12a and 12b with the water level deviation $\Delta h$ of the operation water level detected by the water level detector 8 from the reference water level preset in the reference water level setter 10. The gain compensators 12a and 12b connect the deviation $\Delta h$ into correcting signals for the load instructions to be given to the power stations 5 and 6, on the basis of the gains predetermined by taking account of the control characteristics of the respective power stations 5 and 6. The load instruction correcting signals produced by the gain compensators 12a and 12b are added at the adders 13a and 13b to the load instruction signals which are the outputs of the load distribution units 9a and 9b, respectively. Therefore, if the water level rises in the intermediate reservoir 3, the load instruction directed to the power station 5 is corrected to reduce the output power of the power station 5, while the load instruction directed to the power station 6 is corrected to increase the output power of the power station 6. As a result, the water level of the intermediate reservoir 3 rapdily goes down towards the reference water level $L_o$.

On the other hand, when the operation water level L of the intermediate reservoir 3 descends $\Delta h$ below the reference water level $L_o$, the load instruction directed to the power station 5 is corrected to increase the output power of the power station 5, while the load instruction given to the power station 6 is corrected to decrease the output power of the power station 6. Finally, the water level of the intermediate reservoir 3 rises. In this manner, the water level of the intermediate reservoir 3 is constantly monitored and controlled. By this, the load instructions directed to the respective power stations are corrected, in response to variation of the water level in the intermediate reservoir, to change the output powers of the respective power stations oppositely to each other thereby maintaining the water level substantially constant, while maintaining the sum of the output powers of both power stations at a value corresponding to the total power requirement for the whole power system.

FIG. 3 shows another embodiment in which the construction of the power station control system is simplified compared with that in FIG. 1 and which is featured in that the load distribution to the respective power stations can be corrected only by the water level of the intermediate reservoir. Reference symbols used in FIG. 2 correspond to like ones in FIG. 1. In FIG. 1, the gain compensators 12a, 12b are used to quickly correct the water level of the intermediate reservoir by changing the output powers of the individual water stations 5 and 6. This correction is preferred if water level variation of the intermediate reservoir 3 is required to be relatively small. However, the correction is not necessarily employed if the water level of the intermediate reservoir is allowed to change within a relatively wide range. The embodiment of FIG. 3 is constructed by taking this into account by providing the water level detector 8 for detecting the water level of the intermediate reservoir 3 and the load distribution units 9a and 9b for receiving the detected signal by the water level detector 8 and producing the load instructions to be applied to the individual power stations, but no gain compensators as used in the embodiment of FIG. 1. With this construction, when the water level of the intermediate reservoir 3 rises, that is, the value $h_1$ is decreased, the load instruction produced by the load distribution unit 9a acts to decrease the output power of the power station 5. Simultaneously, the value $h_2$ is increased and hence the load instruction produced by the load distribution unit 9b acts to increase the output power of the power station 6. The water level of the intermediate level reservoir 5 descends as a result of such a control operation. On the contrary, when the water level of the reservoir 3 descends, that is, the value $h_1$ increases, the load instruction produced by the load distribution unit 9a acts to increase the output power of the power station 5, while at the same time the load instruction produced by the load distribution unit 9b acts to decrease the output power of the station 6. As a result, the water level of the reservoir 3 ascends. In this manner, the water level of the reservoir 3 is controlled to maintain substantially constant. As previously stated, if the water level variation is allowed to change within a relatively wide range, the embodiment of FIG. 3 is enough to satisfactorily control the water level even though its construction is simplified.

FIG. 4 is another embodiment of the invention which has features in that the load distribution to the power stations is preset to a predetermined value and then the load distribution is corrected in response to the water level deviation in the intermediate reservoir 3. The load distribution units 9a and 9b in FIG. 1 are arranged to change the load distribution to the power stations depending on the water level of the reservoir 3. The load distribution units 9c and 9d in the FIG. 4 act to distribute the total power required for the whole power station system represented by the overall load instruction $P_t$ into the individual power stations 5 and 6 at a predetermined ratio therebetween. In the embodiment of FIG. 4, the ratio is set at 0.5 to 0.5, assuming that the respective power stations 5 and 6 have the same characteristic with respect to the load instruction and the same rated capacity. In case where those stations 5 and 6 have different characteristics and different rated capacities, the ratio must be changed in compliance with such a condition. The difference between the embodiments of FIG. 1 and FIG. 4 has been described. Except for this difference, both the embodiments operate substantially in the same manner and hence the detail explanation of the embodiment of FIG. 4 will be unnecessary. The embodiment of FIG. 4 provides simple circuit constructions of the load distribution units 9a and 9b, resulting in a low cost of those units.

Figure 5:
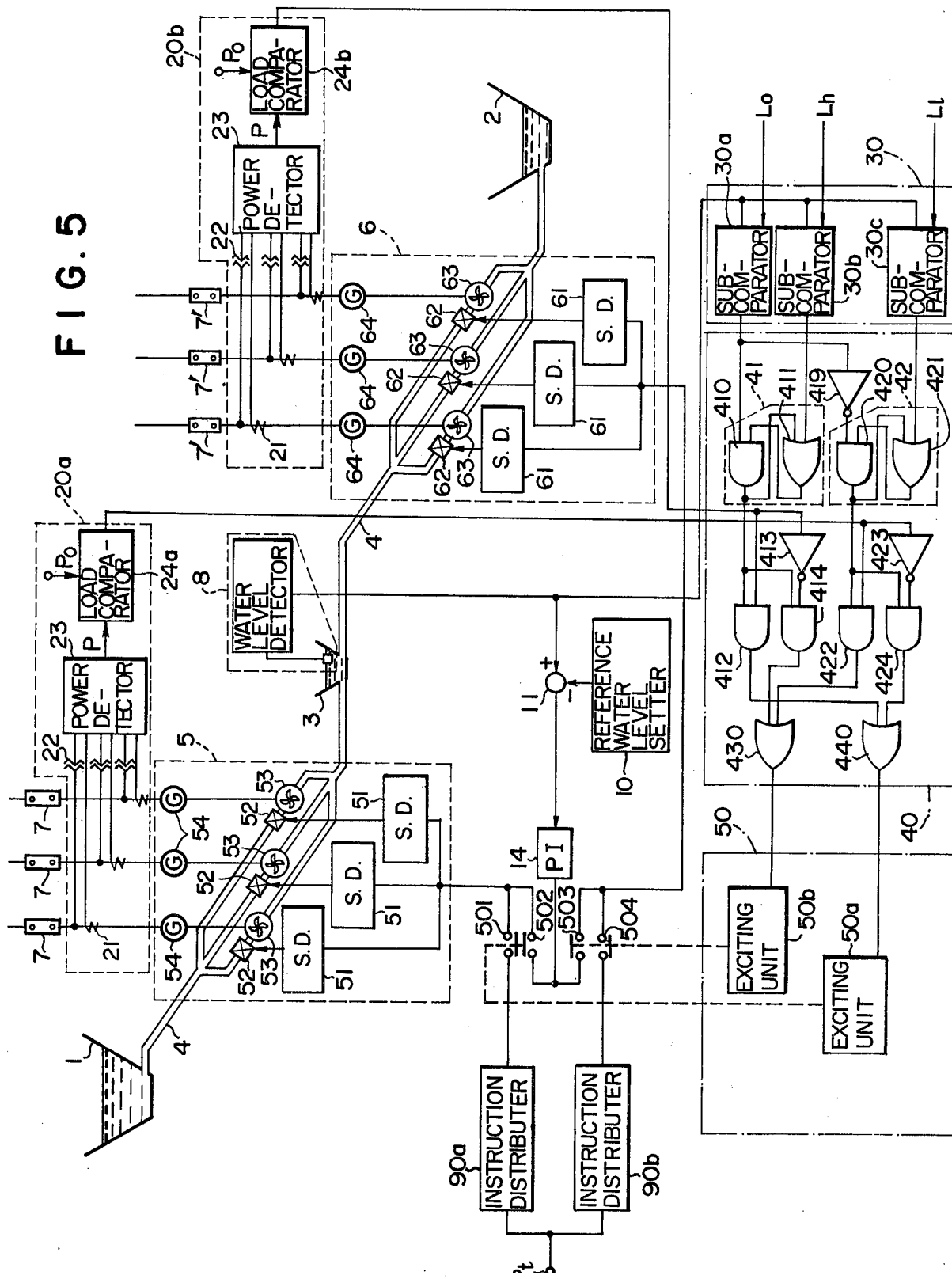
FIG. 5 shows a block diagram of the control system in a further embodiment of the present invention in which, the operation control of the respective power stations is changeable selectively between a mode based on the load instructions to the respective power stations and another mode based on the water level of the intermediate reservoir depending on the operating condition of the power stations and the state of the actual water level.

FIG. 5 shows another embodiment of the invention in which the operation of the power stations is controlled selectively according to either the water level signal or the load instructions depending on the condition of the actual water level of the intermediate reservoir and the operating condition of the respective power stations. Reference symbols used in FIG. 5 correspond to like symbols in FIG. 1. In the figure, the load detectors 20a and 20b comprise a combination of a power detector 23 and a comparator 24a, and a combination of a power detector 23 and a comparator 24b, respectively. The function of each of them is to monitor the operation state of the corresponding power station 5 or 6 and to produce an output when the power station is at its full load condition. The power detector 23 detects the output current and voltage of each dynamo-generator 54 or 64 through the corresponding current and voltage transformer 21 or 22, for obtaining the output power P of each power station 5 or 6. Each comparator 24a or 24b compares the output power P with the set value $P_o$ indicative of the output power at the full load operation of the corresponding power station. The comparator produces a logical "1" when $P \geq P_o$ is established while the logical "0" when $P < P_o$ stands.

Figure 6:
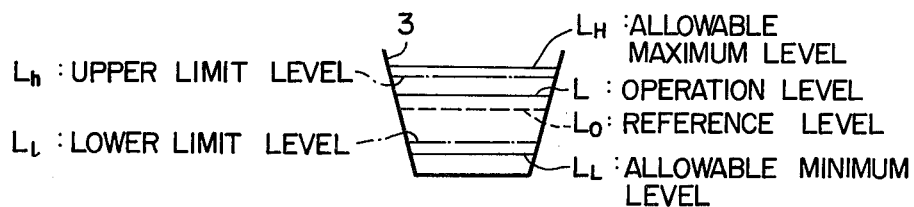
FIG. 6 is a schematic diagram showing the reference level, operation level, upper limit level and lower limit level of the water in the intermediate reservoir.

A water level comparator 30 comprises sub-comparators 30a, 30b and 30c. With respect to the water level of the intermediate reservoir 3, three specific water levels are predetermined which includes; the reference water level $L_o$, the upper limit water level $L_h$, and the lower limit water level $L_l$, as shown in FIG. 6. The lower and upper limit water levels are determined to have some margin to the allowable maximum and minimum water levels $L_H$ and $L_L$, respectively. The sub-comparator 30a compares the operation water level L of the intermediate reservoir 3 detected by the water level detector 8 with the reference water level $L_o$ thereby to produce a logical "1" when $L \geq L_o$, and a logical "0" when $L < L_o$. Likewise, the sub-comparator 30b compares the operation water level L with the upper limit water level $L_h$, thereby to produce a logical "1" when $L \geq L_h$, and a logical "0" when $L < L_{h_1}$. In like manner, the sub-comparator 30c compares the operation water level L with the lower limit water level $L_l$, thereby to produce a logical "1" when $L \geq L_l$ and a logical "0" when $L > L_l$.

A logical circuit 40 comprises a combination of AND elements, OR elements and invertors. The logic 40 receives the logical outputs from the sub-comparators 30a, 30b and 30c of the comparator 30 and the load detectors 20a and 20b, and executes various logical operations. In the case where the operation water level L of the intermediate reservoir 3 exceeds the reference water level $L_o$ and also exceeds the upper limit water level $L_h$ the AND element 410 receives the logical "1" of the comparator 30a and the logical "1" of the comparator 30b applied through the OR element 411, thereby to produce a logical "1" which in turn is applied to the OR element 411. That is, the AND element 410 and the OR element forms a logical latch 41. Accordingly, the logical "1" of the AND element 410 continues until the comparator 30a produces "0." Here, if the power station 6 operates under its full load condition, the AND element 412 produces "1" under the simultaneous presence of the logical "1" of the AND element 410 and "1" of the sub-comparator 24b, and applies the "1" to the OR element 440. If the power station 6 is operating below the full-load, the AND element 414 is conditioned by the presence of "1" of the AND element 410 and "1" derived from the inverter 413 by inverting the logic "0" produced by the comparator 24b, to output "1" which is applied to the OR element 430.

Figure 7:
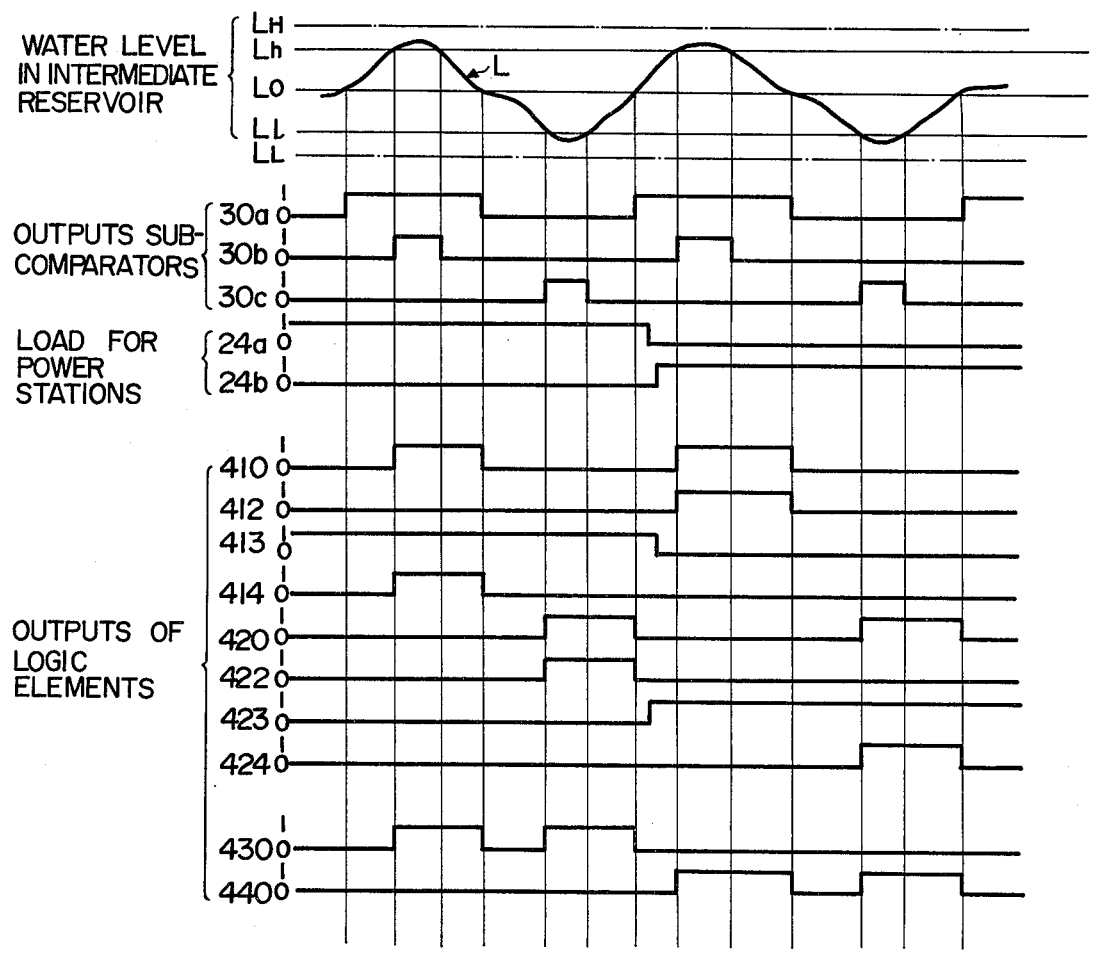
FIG. 7 is a graphic diagram indicating the operation of specific components constituting the embodiment of FIG. 5.

Conversely, when the operation water level of the intermediate reservoir 3 falls below the reference water level $L_o$, and further falls below the lower limit level L, the presence of the logical "1" of the inverter 419 by inverting the logical "0" from the comparator 30a and the logical "1" from the comparator 30c causes the AND element 420 to produce a logical "1" which is applied to the OR element 421. That is, the AND element 420 and the OR element 421 constitute a logical latch 42. Accordingly, the logical "1" of the AND element 420 continues so long as the comparator 30a produces "0." Here, if the power station 5 is operating under its full load condition, the AND element 422 is conditional by the concurrent application of the logical "1" from the AND element 420 and "1" from the inverter 423 which is inversion of the logical "0" from the comparator 24a, to produce a logical "1," which is applied to the OR element 440. FIG. 7 shows a set of timing diagrams for illustrating the operations of the respective elements of the logic 40 under various conditions of the water level of the intermediate reservoir 3 or the operation of the respective power stations. The logical outputs "1's" from the OR elements 430 and 440 are used to change the operation of the respective power stations to be controlled on the basis of the water level deviation of the intermediate reservoir 3.

A magnetic exciting device 50 comprises a couple of magnetic exciting units 50a and 50b, and those units receive the outputs of the OR elements 440 and 430, respectively, to control the opening and closing of the contacts 501 to 504. The contacts 501 to 504 are provided to change the control of the operations of respective power stations from the load instruction mode to the water level deviation mode or vice versa. The contacts 501 and 504 are of the normally open type and the contacts 502 and 503 are of the normally close type. The magnetic exciting unit 50a actuates the contacts 501 and 502 in response to the logical "1" of the OR element 440. The magnetic exciting unit 50b actuates the contacts 503 and 504 upon receiving the logical "1" from the OR element 430. A pair of contacts 501 and 502 and a pair of contacts 503 and 504 are interlocked, respectively.

An adder 11 adds a signal representing the operation water level of the intermediate reservoir 3 produced by the water level detector 8 to a signal representing the reference water level preset in the reference water head setter 10 with polarities as shown, thereby to produce a signal representing the difference between the operation and reference water levels. The difference signal is converted by an adjusting means 14 into a signal for the load instruction. Reference characters 90a and 90b designate load distribution units for distributing the overall load instruction indicative of the total power requirement for the whole power station system into the power stations 5 and 6 respectively.

Explanation will be given of the operation of the control system of FIG. 5 when the operation water level of the intermediate reservoir 3 or the loads of the power stations 5 and 6 vary. Assume that the power stations 5 and 6 operates under the control of the outputs of the load distribution units 90a and 90b. At this time, the normally close contacts 501 and 504 are closed. Under such operating condition, when the operating water level L is above the reference water level $L_o$ and below the upper limit water level $L_h$, the sub-comparator 30a produces a logical "1," and the sub-comparators 30b and 30c each produces a logical "0." In this case, the OR elements 430 and 440 of the logic 40 each produce a logical "0" irrespective of the load operating conditions of the power stations 5 and 6, and thus the magnetic exciting unit 50 does not actuate the contacts. Accordingly, the power stations continue to operate under the control of the outputs of the load distribution units 90a and 90b.

When the operation water level L of the intermediate reservoir 3 exceeds the upper limit water level $L_h$, the sub-comparators 30a and 30b produce a logical "1," while the sub-comparator 30c a logical "0." In this case, if the power station 6 is at its full load operating condition, the sub-comparator 24b produces a logical "1," and the logic 40 applies a logical "1" from the OR element 440 to the magnetic exciting unit 50a which in turn actuates the contacts 501 and 502. More particularly, the opening of the contact 501 disconnects the output of the load distribution unit 90a from the power station 5, while the closing of the contact 502 connects the output of the adjusting means 14 to the power station 5. Through this contact operation, the water flowing into the power station 5 is restricted thereby to lower the water level of the intermediate reservoir 3. If the power station 6 does not reach its full load condition, the sub-comparator 24b produces a logical "0," and the logic 40 applies a logical "1" from the OR element 430 to the magnetic exciting unit 50b which in turn actuates the contacts 503 and 504. That is, the contact 504 opens to disconnect the output of the load distribution unit 90b from the power station, while the contact 503 is closed to connect the output of the adjusting means 14 to the power station. In this manner, the water flow to the power station 6 is increased to lower the water level of the intermediate reservoir 3. If the power station 6 reaches its full load condition with increase of the water flow to the station 6, the comparator 24b changes its output from "0" to "1." The OR element 430 outputs "0" and the OR element 440 produces "1." As a result, the contacts 503 and 504 are released by the exciting unit 50b, while the contacts 501 and 502 are actuated by the exciting unit 50a. In this way, the water flow into the power station 5 is controlled according to the deviation of the water level in the reservoir 3 thereby to lower the operation water level L of the intermediate reservoir 3. However, if the operation water level lowers below the upper limit water level $L_h$ but above the reference water level $L_o$, the above-mentioned logic latch 41 causes the AND element 410 to continue its output of the logical "1." When the operation water level L finally reaches the reference water level $L_o$, the water level adjusting operation in the above-mentioned mode comes to an end. After that, even when the operation water level L falls below the reference water level $L_o$ but above the lower limit $L_l$, the sub-comparators 30a, 30b, and 30c each produce a logical "0." Therefore, irrespective of the operation condition of the respective power stations 5 and 6, the logic 40 produces "0" from each of the OR elements so that none of the exciting units 50a and 50b actuates the contacts. Accordingly, the power stations continue to operate under the control of the output of the load distribution units 90a and 90b.

However, if the operation water level of the resevoir 3 falls below the lower limit water level $L_l$, the sub-comparators 30a and 30b each output "0" while the sub-comparator 30c outputs "1." At this time, if the station 5 is at its full load operation, the output of the sub-comparator 24a is "1," the logic 40 applies "1" from the OR element 430 to the exciting unit 50b which in turn actuates the contacts 503 and 504. That is, the contact 504 opens to shut off the output of the load distribution unit 90b, and the contact 503 closes to allow the output of the adjusting means 14 to be applied to the power station. As a result, the water flow into the power station 6 is restricted thereby to cause a rise of the water level of the intermediate reservoir 3. If the power station 5 operates below its full load condition, the output of the sub-comparator 24a is "0," and the logic 40 applies "1" from the OR element 440 to the magnetic exciting unit 50a which in turn actuates the contacts 501 and 502. Then, the contact 501 opens to shut off the output of the load distribution unit 90a, while the control 502 closes to allow the output of the adjusting means 14 to be applied to the power station, with a result that the water flow into the power station 5 increases to cause a rise of the water level of the intermediate reservoir 3. With increase of the water flow into the power station 5, if the power station 5 reaches its full load operation, the sub-comparator 24a changes its output from "0" to "1," and hence the OR element outputs "0" and the OR element 430 outputs "1." Therefore, the exciting unit 50a releases the actuation of the contacts 501 and 502, while the exciting unit 50b actuates the contacts 503 and 504. Thus, the water flow into the power station 6 is changed to cause a rise of the operation water level L of the intermediate reservoir 3. However, if the operation water level rises above the lower limit $L_l$, but below the reference water level $L_o$, the logic latch 42 causes the AND element 420 to continue its output of logical "1," until the operation water level L reaches the reference one $L_o$ when the water level adjusting operation in the above-mentioned mode comes to an end. Thus, the water level of the intermediate reservoir is controlled to be kept substantially constant.

Figure 8:
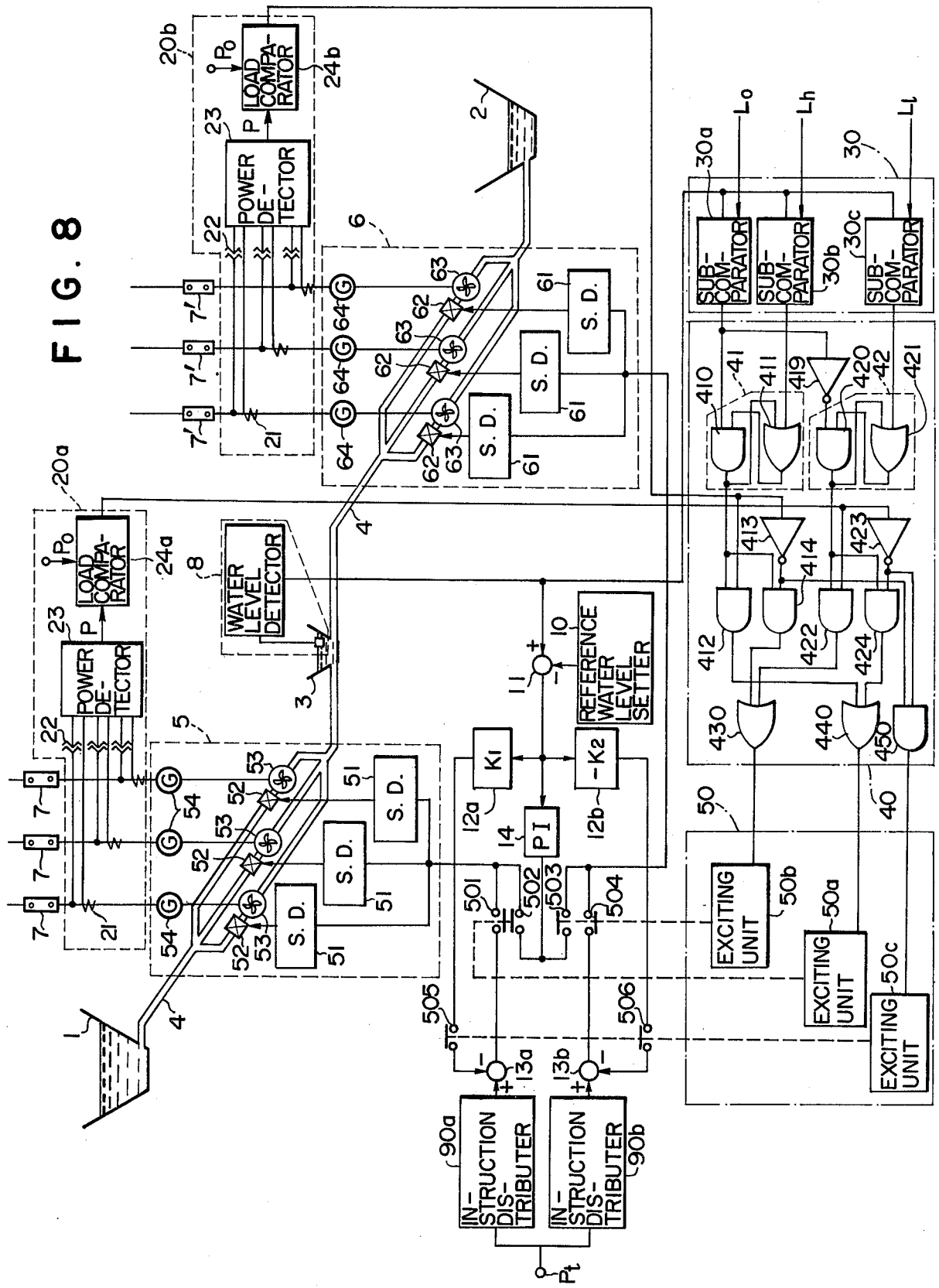
FIG. 8 is a block diagram of the control system in a further embodiment of the present invention in which the load instructions to both power stations are corrected according to the deviation of the water level o the intermediate reservoir when both the power stations are below their full load condition.

FIG. 8 shows a control system for the power stations in a fifth embodiment of the present invention which is adapted to more strictly and efficiently control the operations of the respective power stations. This embodiment is basically the same as that of FIG. 5, except that, when both the power stations do not reach their full load conditions, the water level deviation of the intermediate reservoir 3 is used, in addition to the load instructions for the respective power stations to control them. More precisely, the embodiment of FIG. 8 corresponds to the embodiment of FIG. 5 combined with the following additional functions. First, an element 450 is added in the logic 40 and arranged to output a logical "1" to be applied to an exciting unit 50c additionally provided in the device 50, only when both the power stations 5 and 6 are below their full load conditions. Upon receiving the logical "1," the exciting unit 50c actuates the contacts 505 and 506. The normally open contacts 505 and 506 are used to turn on and off the signals from the gain compensators 12a and 12b. Both the contacts are interlocked to be simultaneously actuated by the exciting unit 50c. It is noted here that the gain compensators 12a and 12b and the adders 13a and 13b in this embodiment have the same functions as those designated by the same reference numerals in FIG. 1. That is, the load instructions applied to the respective power stations are produced for the power station operations in a manner that the outputs of the load distribution units 90a and 90b and the outputs of the gain compensators 12a and 12b are added with polarities as shown in the adders 13a and 13b, respectively, and the added outputs are used for operating the respective power stations. With such a construction, the water level of the intermediate reservoir is kept substantially constant and a stable operation of the power stations is ensured to meet the load instructions directed to the respective power stations.

Figure 9:
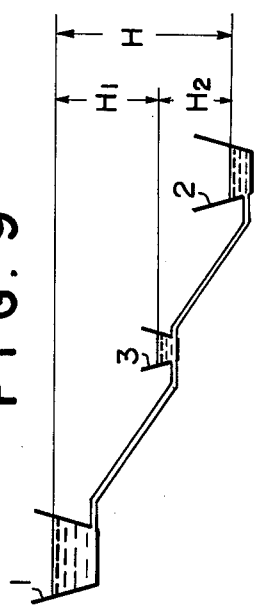
FIG. 9 is a schematic diagram illustrating the differences between the water levels of the respective reservoirs.
Figure 10:
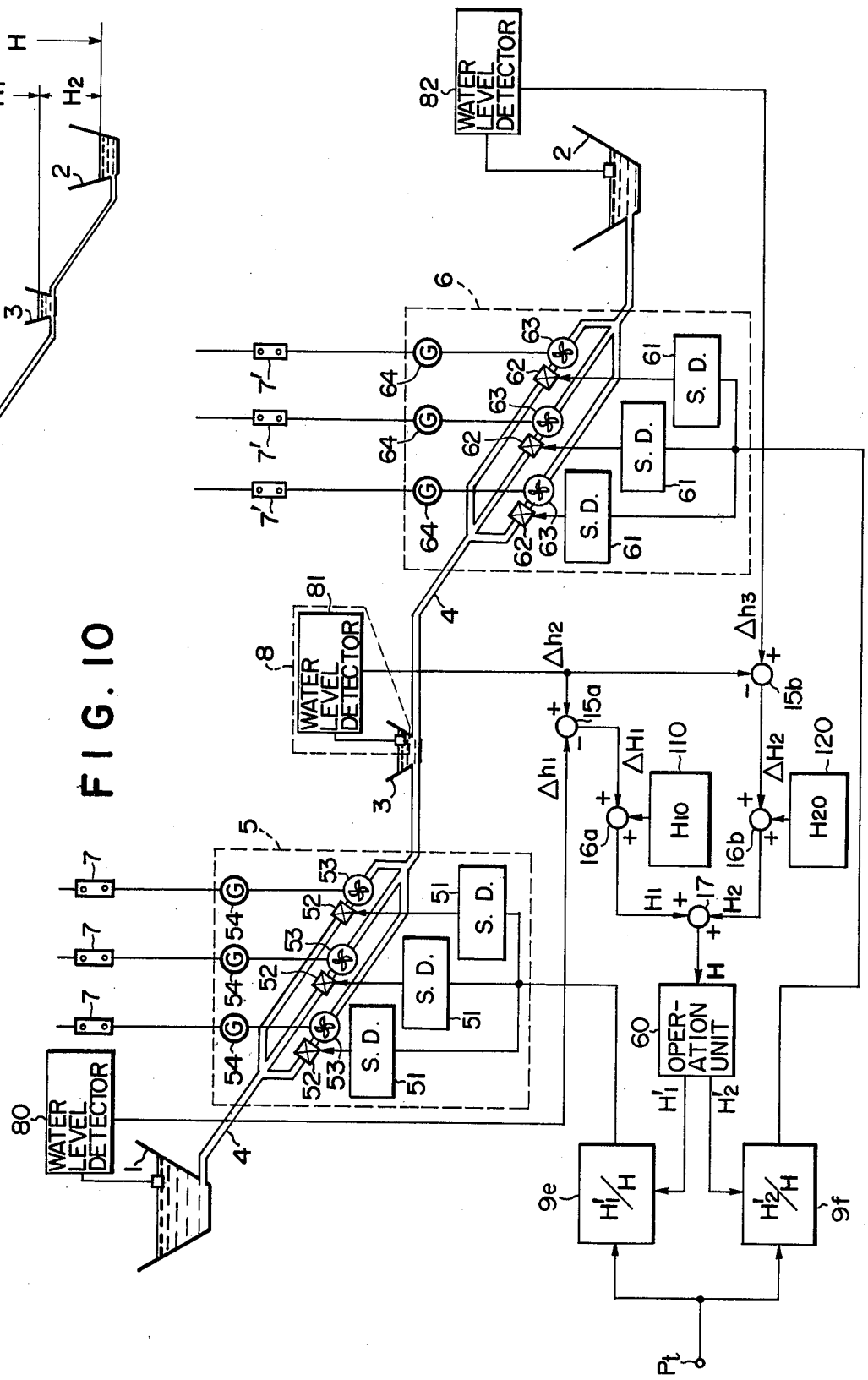
FIG. 10 is a block diagram of the control system in a further embodiment of the present invention in which the operation of the power stations is controlled while maintaining substantially constant the ratio of the water level difference between the upper and intermediate reservoirs to that between the intermediate and lower reservoirs.

FIG. 10 shows another control system in which the operation water level of the intermediate reservoir 3 is kept substantially constant by keeping constant the ratio of the water level difference between the water levels of the upper and intermediate reservoirs 1 and 3 to the water level difference between the water levels of the intermediate and lower reservoirs 3 and 2. Assume that, as shown in FIG. 9, the actual water level differences between the upper and intermediate reservoirs 1, 3, between the intermediate and lower reservoirs, 3, 2 and between the upper and lower reservoirs 1, 2 are $H_1$, $H_2$ and H, respectively. Further assume that the values $H_1$, $H_2$ and H take $H_{10}$, $H_{20}$ $H_0$ when th power stations are at their stable operation condition and the operation water levels of the reservoirs are at their reference levels, respectively. Then the following relations are given.

$$H_o = H_{10} + H_{20} \tag{1}$$

Since the ratio $H_{20}/H_{10}$ is constant, then $$H_{20}/H_{10} = C \tag{2}$$

is given and hence $$H_{10} = \frac{1}{1+C} H_o \tag{3}$$

$$H_1 = \frac{C}{1+C} H_o \tag{4}$$

In this embodiment, when the actual water level differences $H_1$, $H_2$ and H are different from $H_{10}$, $H_{20}$ and $H_o$, the control is performed so as to maintain similar relationships among them, that is, $$H_1 = \frac{1}{1+C} H \tag{3}'$$

$$H_2 = \frac{C}{1+C} H \tag{4}'$$

by correcting the load instructions applied to the respective power stations. In this way, the amounts of water flowing into the power stations 5 and 6 are controlled thereby to maintain the water level of the intermediate reservoir 3.

In FIG. 10, like symbols are used to designate like functions in FIG. 1. In the figure, water level deviation detectors designated by 80, 81 and 82 are used for detecting the water level deviations $\Delta h_1$, $\Delta h_2$ and $\Delta h_3$ of the operation water levels from the reference water levels in the upper, intermediate and lower reservoirs 1, 3 and 2, respectively. Adder 15a acts to add the outputs $\Delta h_1$ and $\Delta h_2$ of the water level deviation detectors 80 and 81 with polarities as shown in the figure, thereby obtaining the deviation $\Delta H_1$ of the water difference $H_1$. Adder 15b for obtaining the deviation $\Delta H_2$ of the water level difference $H_2$ adds the outputs $\Delta h_2$ and $\Delta h_3$ of the water level deviation detectors 81 and 82. Reference water level difference setters designated by numerals 110 and 120, outputs the reference water level differences $H_{10}$ and $H_{20}$ which are preliminarily set therein. Adder 16a adds the reference water level difference $H_{10}$ to the deviation $\Delta H_1$ to produce the water level difference $H_1$. Adder 16b adds the reference water level difference $H_{20}$ to the deviation $\Delta H_2$ to produce the water level difference $H_2$. Adder 17 adds the water level differences $H_1$ and $H_2$ to give the total water level difference H. Operation unit represented by reference numeral 60 receives the total water level difference H and calculates desired water differences $H_1'$ and $H_2'$ by multiplying H by $1/(1+C)$ and $C/(1+C)$, respectively, according to the equations (3) and (4). As shown in FIG. 11, the operation unit 60 comprises a ratio setter 610 and operation circuits 62a and 62b. The ratio setter 610 outputs a constant ratio C of the water level differences $H_2$ to $H_1$. The operation circuits 62a and 62b executes the calculations of the equations (3) and (4) by using the outputs of the adder 17 and the ratio setter 610, for outputting signals indicative of the water level differences $H_1'$ and $H_2'$. The outputs $H_1'$ and $H_2'$ are related to each other with $H_2'/H_1' = C$. The load distribution units 9e and 9f receive the values $H_1'$ and $H_2'$ and multiply the overall load instruction $P_t$ by $H_1'/H$ and $H_2'/H$ which are then applied to the power stations 5 and 6. Thus, by keeping constant the ratio of the water level differences $H_1$ and $H_2$, the water level of the intermediate reservoir 3 is kept substantially constant.

Other embodiment of the invention shown in FIG. 12 is featured in that, when the difference between the operation water level and the reference water level of the intermediate reservoir 3 exceeds a predetermined value, the load instruction of at least one of the power stations is corrected so as to keep constant the water level of the intermediate reservoir 3. In FIG. 12, like symbols designate like components in FIG. 1. The load distribution units 9g and 9h distribute the overall load instruction for the power requirement for the whole power station sytem into the respective power stations 5 and 6, respectively. The output of the load distribution unit 9h is applied to the power station 6, through a contact 507, a memory 70, and an adder 18. Here, the contact 507 of the normally closed type opens when actuated by a magnetic exciting means 73 and holds its opening state even after the excitation is ceased, until it is closed by suitable manual means (not shown). Only when the deviation of the operation water level from the reference water level exceeds a predetermined range, an inhibiting element 71 allows the above deviation signal to be applied to the gain compensator 72. The gain compensator 72 converts the deviation signal into a compensating signal to be used for correcting the load instruction according to the deviation by the adder 18. The magnetic exciting means $T_3$ actuates the contact 507 to open upon receiving the output of the inhibiting element 71. The memory 70 stores the load instruction derived from the unit 9h just before the contact 507 opens and applies the stored load instruction to the adder 18. The adder 18 adds the output of the memory 70 to the output of the gain compensator 72. The result of the addition is applied to the power station 6.

Description will be made about the operations of the respective parts of the system of FIG. 12 when the operation water level of the intermediate reservoir 3.

Assume now that the operation water level of the intermediate reservoir 3 is near to the reference water level and the output $\Delta h$ of the adder 11 is within the predetermined range D, called hereinafter as non-responsive range, which is preset in the inhibiting element 71 such that the inhibiting element produces an output corresponding to the output $\Delta h$ of the adder only when $\Delta h$ comes outside the non-responsive range $D_1$. In this case, the inhibiting element 71 produces no output and thus the contact 507 holds its closing state.

Under this condition, if an instruction for load change is issued from, for example, the power supply command office, a load instruction $P_t$ according to the load change instruction is applied to the control system whereby the respective power stations 5 and 6 are controlled by the outputs of the corresponding load distribution units 9g and 9h. At this time, the adder 18 outputs only the signal supplied from the memory 70, since no output is produced by the gain compensator 72. The memory 70 stores the output of the load distribution unit 9h and the content of the memory is charged every time when the output of the unit 9h is changed. If such a control fails to make the amount of water flow into the power station 5 equal to that of the power station 6, the operation water level of the intermediate reservoir varies. The operation water level is always detected by the water level detector 8 and the detected value is applied to the adder 11. The adder 11 compares the operation water level with the reference water level of the intermediate reservoir to produce the variation $\Delta h$. When the variation $\Delta h$ comes outside the non-responsive range $D_1$ of the inhibiting element 71, the element 71 produces its output. In response to the output, the exciting unit 73 actuates the contact 507 to open. The opening of the contact 507 prevents the load instruction from the load distribution unit 9h from being applied the memory 70. As a result, the load change instruction is made ineffective to control the power station 6. Instead, the memory 70 stores and produces, as its output, the output of the load distribution unit 9h which has been applied thereto just before the contact 507 opens. The gain compensator 72 receives the deviation $\Delta h$ from the inhibiting element 71, and converts the difference $\Delta h$ into a compensating signal to be used for correcting the load instruction. The compensating signal is applied to the adder 18 for the purpose. The adder 18 adds compensating signal to the output of the memory 70, and the result of the addition is applied to the power station 6. Accordingly, the control of the power station 6 on the basis of the water level of the intermediate reservoir 3, commence when the contact 507 opens.

Assume now that the water level of the intermediate reservoir 3 rises to cause the deviation $\Delta h$ of the water level to exceed the non-responsive range $D_1$ of the inhibiting element 71 thereby to produce its output. At this time, the output of the adder 11 and hence the output of the inhibiting element 71 takes positive polarity because the water level is higher than the reference level. For this, the output of the adder 18 further increases since the output of the gain compensator 72 is further added to the output of the memory 70. The result is such that the water flow into the power station 6 increases to prevent the water level of the middle level reservoir 3 from abnormally rising.

In the case of an undesirable lowering of the water level of the intermediate reservoir 3, an adjusting procedure similar that in the rise of the water level as above mentioned will be effected. The difference from the case of water level rise is merely that the output of the inhibiting element 71 takes a negative polarity and the output of the adder 18 becomes smaller than the load instruction thereby to cause the water flow into the power station 6 to be reduced.

As described above, the water level of the intermediate reservoir 3 is controlled to be stable by appropriately selecting the gain of the gain compensator 72 and the non-responsive range set in the inhibiting element 71.

Figure 13:
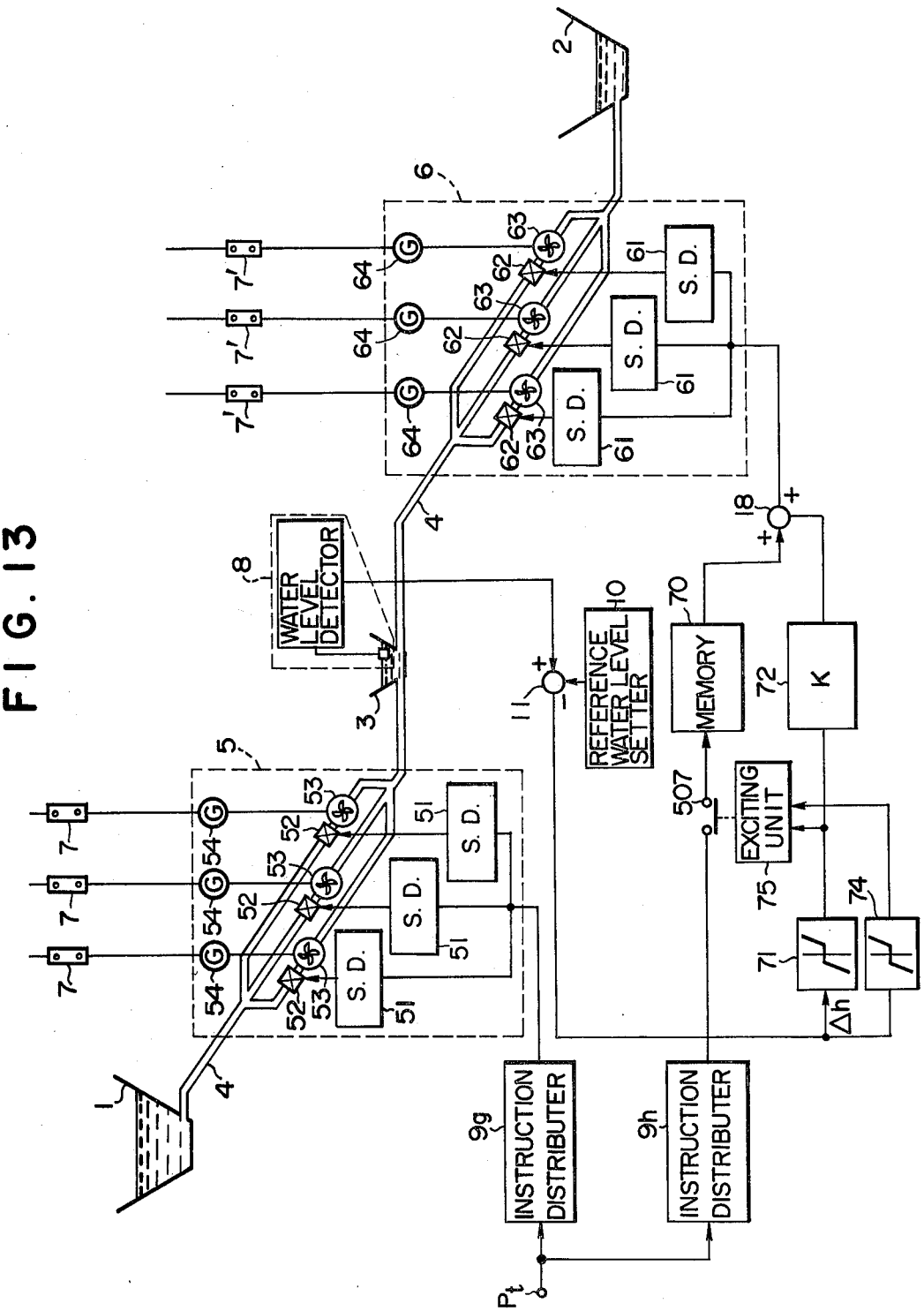
FIG. 13 is a block diagram of the control system in a still further embodiment of the present invention in which provision is made to modify the embodiment of FIG. 13 to further include means for changing the control of the at least one power station from the water level mode to a load instruction mode when the deviation of the water level comes within the predetermined range.

A further modification of the embodiment of the invention will be given with reference to FIG. 13.

In the embodiment of the FIG. 12, when the deviation of the water level of the intermediate reservoir 3 exceeds a predetermined range preset in the inhibiting element and the contact 507 is opened, the power station 6 is controlled only by the outputs of the memory 70 and the gain compensator 72, independently of the change of the load instruction. For this, after the contact 507 is once opened, the control of the power station hardly follows the change of the load instruction. In this modification, the control circuit is arranged such that, even when the contact 507 is opened, if the deviation of the water level of the intermediate reservoir comes within the predetermined range, the contact 507 is returned to its closed state and the power stations are again controlled on the basis of the load instruction so as to follow its change. In other words, the embodiment of the FIG. 13 is constructed such that another inhibiting element 74 is added to the construction of FIG. 12, and a different magnetic exciting unit 75 is used in place of the unit 73 in FIG. 12.

The additional inhibiting element 74 is connected in parallel with the inhibiting element 71, and arranged to be set with a non-responsive range $D_2$ smaller than the non-responsive range $D_1$ of the latter. The exciting unit 75 opens the contact 507 in response to the output of the inhibiting element 71, and closes the same in response to the output of the inhibiting element 74.

Description will be made of the operation of the embodiment of FIG. 13 in case of variation of the water level of the intermediate reservoir 3.

When the water level of the intermediate reservoir 3 is very near to the reference water level and the output $\Delta h$ of the adder 11 is smaller than the non-responsive ranges $D_1$ and $D_2$ of the respective inhibiting elements 71 and 74, both the inhibiting elements 71 and 74 produce no output, with the result that the control 507 holds its closed state.

Under this condition, when the power supply command office issues a load change instruction the respective power stations 5 and 6 are controlled by the outputs of the load distribution units 9g and 9h. As in the previous case, when the amount of the water flowing into the power station 5 is larger or smaller than that into the power station 6, the water level of the intermediate reservoir 3 changes. If the water level of the reservoir 3 rises, the water level is detected by the water level detector 8, and the detected value is inputted to the adder 11. The output $\Delta h$ of the adder 11 is compared with the non-responsive ranges $D_1$ and $D_2$. If $D_2 < \Delta h < D_1$ is established, only the inhibiting element 74 operates. However, the contact 507 continues its close condition because of inoperation of the inhibiting element 71. This allows the output of the load distribution unit 9h to be applied to the power station 6 through the memory 70, and the adder 18.

When the output $\Delta h$ of the adder 11 exceeds the non-responsive range $D_1$, the inhibiting element 71 produces an output. Upon receipt of the output, the exciting unit 75 actuates the contact 507 to open it. The opening of the contact 507 prevents any changed load instruction from being applied to the power station 6. Simultaneously, the output of the inhibiting element 71 is converted by the gain compensator 72 into the compensating signal for correcting the instruction signal, which in turn is applied to the adder 18, together with the output of the memory 70. Both the inputs are added in the adder 18 and the results of the addition is applied to the power station 6. This results in increase of the amount of water flowing into the power station 6. With the increase, the water level of the intermediate reservoir 3 gradually lowers to approach the reference water level.

As the water level of the intermediate reservoir 3 lowers in this way, the output $\Delta h$ of the adder 11 becomes gradually smaller. When $D_2 < \Delta h < D_1$ is established, the inhibiting element 71 ceases to produce its output but the inhibiting element 74 produces an output. Accordingly, in response to the output of the inhibiting element 74, the exciting unit 75 causes the contact 507 to be again closed. As the result of the reclose, the changed load instruction is allowed to be applied to the power station 6, through the memory 70. At this time, the output of the inhibiting element 74 is applied to the adder 18, through the gain compensator unit 72. Therefore, the power station 6 is controlled by the output of the adder 18 so that the water level of the intermediate reservoir 3 is maintained constant.

Although the case of the water level rise of the reservoir 3 have been described, the lowering of the water level is similarly controlled.

In the embodiment heretofore described, when the water level of the reservoir 3 exceeds a predetermined range, the power station 6 is exclusively controlled on the basis of the water level of the intermediate reservoir 3 thereby, preventing the water level of the reservoir 3 from being abnormally raised. When the water level of the reservoir 3 falls within the predetermined range, the control of the power stations 5 and 6 is carried out in the mode based on the load instructions which may change. Accordingly, this embodiment is effective to control the water level of the intermediate reservoir, especially when its storage capacity is small, while the output of the whole power station system is controlled to follow the change of the load instruction.

In this embodiment, the deviation $\Delta h$ of the operation water level from the reference water level of the intermediate reservoir 3 is used for controlling the power station 6. Such a construction that the deviation $\Delta h$ is used to control the power station 5 may attain the same effect.

Figure 14:
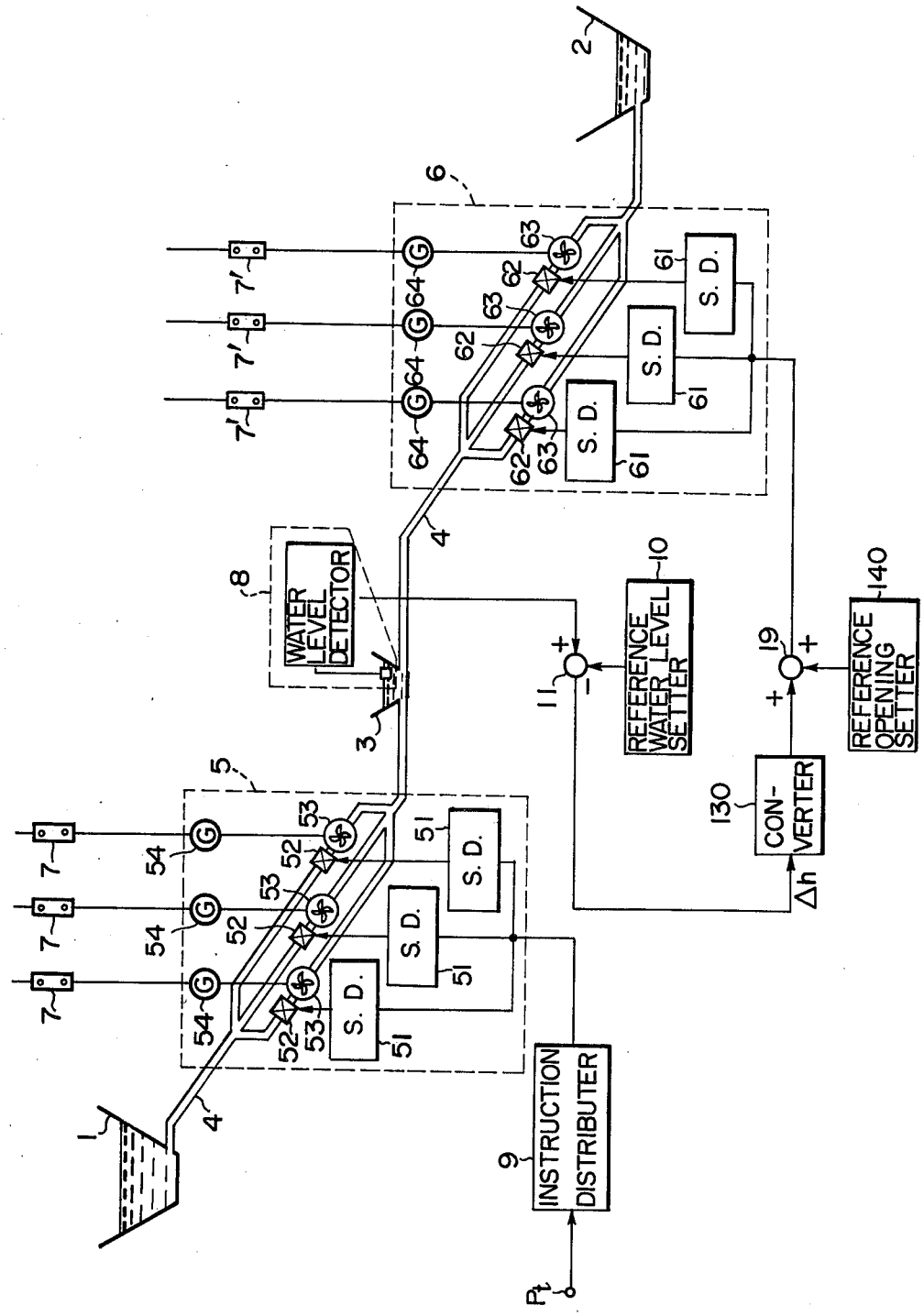
FIG. 14 is a block diagram of the control system in another embodiment of the present invention in which one of the power stations is controlled according to the load instruction applied thereto and the other power station is controlled so as to control the water level of the intermediate reservoir.

In another embodiment as shown in FIG. 14, one of the power stations is controlled in the mode on the basis of the load instruction, and the other power station is controlled in the mode on the basis of water level of the intermediate reservoir 3.

In the FIGURE, like symbols designate like or equivalent components of FIG. 1. Reference numeral 9 designates a load distribution unit for distributing the load instruction $P_t$ to the power station 5. The share of load for the power station 5 determined by this distribution depends on the load to be shared by the power station 6. The deviation Δh of the operation water level of the reservoir 3 detected by the water level detector 8 from the reference water level represented by the output of the reference water level setter 10 is converted by the converter 130 into a signal for controlling the opening of each of the guide vanes 62 of the power station 6. The adder 19 adds this opening controlling signal to the output of the reference which indicates the reference opening of each guide vane 62. The result of the addition is applied to each guide vane 62 thereby to control the power station 6. The reference opening signal i.e. the output of the reference opening setter 140 is determined on the basis of the opening of the guide vanes 62 of the power stations when the power station 5 operates under the control of the load distribution unit 9, and the operation water level of the reservoir 3 is equal to the reference water level.

Now, the operations of the system in FIG. 14 will be described. When the load instruction directed to the power station 5 increases the output power of the station and the operation water level of the intermediate reservoir 3 rises to exceed the reference water level, the water level deviation Δh is detected as positive, and the converter 130 produces a signal to increase the opening of the guide vanes 62 of the power station 6 so that the output of the power station 6 increases and thus the increase of the output power of the power station 6 satisfies, together with the increase of the output power of the power station 5, the required increase for the total power of the power station system. On the contrary, when the load instruction directed to the power station 5 indicates to decrease the output power thereof, and the operation water level of the intermediate reservoir falls below the reference water level, the water level deviation Δh is detected as negative, and the converter 130 produces a signal to decrease the opening of the guide vanes 62 of the power station 6 so that the output of the power station 6 decreases and the decrease of the output power of the power station 6 satisfies, together with the decrease of the output power of the power station 5 satisfies the required decrease for the total power of the power system. In this manner, the operation water level of the intermediate reservoir 3 is kept substantially constant.

If it is unnecessary to control the water flow into the power station 6 when the deviation of the water level of the intermediate reservoir 3 is smaller than a predetermined value, an inhibiting element 71 as shown in FIG. 12 may be inserted before or after the converter 130 in FIG. 14.

As seen from the foregoing description, according to the present invention, the water level of the intermediate reservoir is controlled to be kept substantially constant while the operation of both the power stations is controlled to the extent that the output powers thereof satisfactorily meet the load instruction.

We claim:

1. A control system for hydroelectric power station system including three water reservoir means having different water levels and connected in cascade through water channels therebetween and power stations in the respective water channels, in which load instructions applied to said respective power stations are corrected according to the water level of said intermediate reservoir and the operating condition of said respective power stations.

2. A control system for controlling a hydroelectric power station system including first and second water reservoirs of different water levels, a third water reservoir provided in cascade with and between said first and second reservoirs and having a water storage capacity smaller than those of said first and second reservoirs, and power stations provided between said first and third reservoirs and between said third and second reservoirs, respectively, in which load instructions applied to said respective power stations are produced by distributing an overall load instruction in accordance with the water level of said third reservoir.

3. A control system according to claim 2, in which said load instructions are corrected according to the deviation of the water level of said third reservoir.

4. A control system for controlling a hydroelectric power station system including first and second water reservoirs of different water levels, a third water reservoir provided in cascade between said first and second reservoirs and having a water storage capacity smaller than those of said first and second reservoirs and power stations between said first and third reservoirs and between said third and second reservoirs, respectively, in which load instructions applied to said respective power stations are produced by distributing an overall load instruction with a ratio determined in accordance with the rated outputs of said respective power stations and the load instructions are corrected according to the deviation of the water level of said third reservoir.

5. A control system for a hydroelectric power station system including first and second water reservoirs of different water levels, a third water reservoir provided between said first and second reservoirs in cascade and having a water storage capacity smaller than those of said first and second reservoirs, and power stations provided between said first and third reservoirs and between said third and second reservoirs, respectively, in which the load instructions applied to said respective power stations are produced by distributing an overall load instruction in accordance with the water levels of said first, second and third reservoirs.

6. A control system according to claim 5, in which the distribution of the overall load instruction is carried out so as to maintain the ratio of the difference of the water level between said first and third reservoirs to that between said third and second reservoirs substantially constant.

7. A control system for controlling a hydroelectric power station system including first and second water reservoirs located upstream and downstream, respectively, in a water system, a third water reservoir located between said first and second reservoirs and having a smaller water storage capacity than that of any one of said first and second reservoirs, and first and second power stations provided between said first and third reservoirs and between said third and second reservoirs, respectively, said control system comprising first means for dividing a total load instruction representative of a required total power generation of said power station system into first and second individual load instructions and controlling said first and second power stations according to said first and second individual load instruction, respectively, and second means for selectively controlling at least one of said first and second power stations according to variation of the water level of said third water reservoir in place of the individual load instruction for the respective power stations depending on the water level of said third reservoir and the operating conditions of said power stations.

8. A control system according to claim 7, wherein said at least one power station controlled by said second means is said first power station when the water level of said third reservoir exceeds a predetermined upper limit and said second power station operates at its full capacity.

9. A control system according to claim 7, wherein said at least one power station controlled by said second means is said second power station when the water level of said third reservoir exceeds a predetermined upper limit and said second power station operates at less than its full capacity.

10. A control system according to claim 7, wherein said at least one power station controlled by said second means is said second power station when the water level of said third reservoir is below a predetermined lower limit and said first power station operates at its full capacity.

11. A control system according to claim 7, wherein said at least one power station controlled by said second means is said first power station when the water level of said third reservoir is below a predetermined lower limit and said first power station operates at less than its full capacity.

12. A control system according to claim 7, further comprising third means for correcting said first and second individual load instructions according to deviation of the water level of said third reservoir when both of said first and second power stations operate at less than their full capacities.

13. A control system for controlling a hydroelectric power station system including first and second water reservoirs located upstream and downstream, respectively, in a water system, a third water reservoir located between said first and second reservoirs and having a smaller water storage capacity than that of any one of said first and second reservoirs, and first and second power stations provided between said first and third reservoirs and between said third and second reservoirs, respectively, said control system comprising first means for dividing a total load instruction representative of a required total power generation of said power station system into first and second individual load instructions and for controlling said first and second power stations according to said first and second individual load instructions, respectively, and second means for selectively controlling at least one of said first and second power stations according to variation of the water level of said third reservoir in place of said individual load instruction for the respective power stations when the variation of the water level of said third reservoir exceeds at least one predetermined range.

14. A control system according to claim 13, wherein said second means selectively controls at least one of said first and second power stations when the variation of the water level of said third reservoir exceeds first and second predetermined ranges.

15. A control system for controlling a hydroelectric power station system including first and second water reservoirs located upstream and downstream, respectively, in a water system, a third water reservoir located between said first and second reservoirs and having a smaller water storage capacity than that of any one of said first and second reservoirs, and first and second power stations provided between said first and third reservoirs and between said third and second reservoirs, respectively, said control system comprising first means for controlling the output of one of said first and second power stations according to a total load instruction representative of a required total power generation of the power station system, and second means for controlling the output of the other of said first and second power stations so as to maintain the water level of said third water reservoir substantially constant.

* * * * *